United States Patent
Fu et al.

(10) Patent No.: US 8,436,594 B2
(45) Date of Patent: May 7, 2013

(54) CONTROL CIRCUIT AND METHOD FOR A DIGITAL SYNCHRONOUS SWITCHING CONVERTER

(75) Inventors: Yi-Chiang Fu, Zhubei (TW); Wei-Hsu Chang, Jubei (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 708 days.

(21) Appl. No.: 12/654,318

(22) Filed: Dec. 17, 2009

(65) Prior Publication Data
US 2010/0156376 A1 Jun. 24, 2010

(30) Foreign Application Priority Data
Dec. 22, 2008 (TW) .............................. 97149990 A

(51) Int. Cl.
*G05F 1/59* (2006.01)
(52) U.S. Cl.
USPC .......................................... 323/271; 323/283
(58) Field of Classification Search .................. 323/271, 323/283
See application file for complete search history.

(56) References Cited

U.S. PATENT DOCUMENTS

| | | | | |
|---|---|---|---|---|
| 5,955,872 A * | 9/1999 | Grimm | | 323/283 |
| 7,548,048 B2 * | 6/2009 | Chang | | 323/283 |
| 7,589,506 B2 * | 9/2009 | Brown | | 323/271 |
| 7,652,460 B2 * | 1/2010 | Chang et al. | | 323/283 |
| 8,030,911 B2 * | 10/2011 | Nien et al. | | 323/283 |
| 2007/0257653 A1 * | 11/2007 | Naka | | 323/284 |
| 2008/0054869 A1 * | 3/2008 | Chang | | 323/283 |
| 2010/0156376 A1 * | 6/2010 | Fu et al. | | 323/283 |
| 2011/0084673 A1 * | 4/2011 | Chang et al. | | 323/271 |
| 2011/0267016 A1 * | 11/2011 | Kajiyama | | 323/271 |
| 2012/0056605 A1 * | 3/2012 | Ooba | | 323/271 |
| 2012/0126761 A1 * | 5/2012 | Tuten | | 323/271 |
| 2012/0200274 A1 * | 8/2012 | Tang et al. | | 323/271 |

* cited by examiner

*Primary Examiner* — Jeffrey Sterrett
(74) *Attorney, Agent, or Firm* — Muncy, Geissler, Olds & Lowe, PLLC

(57) ABSTRACT

In addition to an output voltage control loop, a dead-time optimization loop is provided for a digital synchronous switching converter to dynamically adjust the dead-time for the power switches of the converter. It is extracted a minimal feedback signal at a steady state while the output voltage remains under a specification, and a maximal efficiency of the digital synchronous switching converter is thus obtained.

10 Claims, 6 Drawing Sheets

CONTROL CIRCUIT AND METHOD FOR A DIGITAL SYNCHRONOUS SWITCHING CONVERTER

FIELD OF THE INVENTION

The present invention is related generally to a digital synchronous switching converter and, more particularly, to a control circuit and method for a digital synchronous switching converter.

BACKGROUND OF THE INVENTION

In a conventional synchronous switching buck converter, to prevent the high-side and low-side power switches from being turned on simultaneously during the switching thereof, it needs a dead-time during which both the high-side and low-side power switches are turned off. However, the dead-time may lead to efficiency degradation. Dead-time too long will result in a long time body diode conduction which will lead to power loss. On the contrary, too short dead-time will result in a short time conduction of power switches which also will lead to power loss. Thus, an optimized dead-time is needed to improve the efficiency of a converter.

FIG. 1 is a circuit diagram of a conventional digital synchronous buck converter 10 with sensorless optimization of dead-time, which includes an error amplifier 18 to generate an error signal e by comparing the output voltage VOUT of the converter 10 with a reference voltage Vref, a compensator 16 to compensate the error signal e to generate a feedback signal d, a pulse width modulator 14 to generate a pulse width modulation signal g according to the feedback signal d, a dead-time imposer 12 to generate two modified signals according to the pulse width modulation signal g and delay times td1 and td2, and a driver 11 to generate driving signals Vg1 and Vg2 according to the output signals of the dead-time imposer 12 to switch the power switches Q1 and Q2, respectively, and thereby convert an input voltage VIN into the output voltage VOUT. FIG. 2 is waveform diagram of the converter 10, in which waveform 20 represents the driving signal Vg2 and waveform 22 represents the driving signal Vg1. In the converter 10, when the driving signal Vg2 transits from high to low, the delay time td2 is imposed to delay the triggering of the driving signal Vg1. Similarly, when the driving signal Vg1 transits from high to low, the delay time td1 is imposed to delay the triggering of the driving signal Vg2. However, the dead-time optimization is implemented based on the output of the pulse width modulator 14, regardless of the output status of the driver 11. Thus, a shoot-through could be resulted once the delay times td1 and td2 are too short.

Therefore, it is desired a circuit and method for adjusted dead-time based on the output of the driver to obtain maximal efficiency of a converter.

SUMMARY OF THE INVENTION

An object of the present invention is to provide a control circuit and method for a digital synchronous switching converter.

According to the present invention, a control circuit for a digital synchronous switching converter includes a driver to provide two driving signals according to a pulse width modulation signal, to switch a pair of serially connected power switches to generate an output voltage, a feedback loop to detect the output voltage to generate a digital feedback signal, a digital pulse width modulator to provide the pulse width modulation signal according to the digital feedback signal, for the driver to regulate the output voltage, and a dead-time optimizer to dynamically adjust a dead-time of the power switches according to the digital feedback signal, to improve the efficiency of the digital synchronous switching converter. The driver monitors the two driving signals to prevent the power switches from being turned on simultaneously and thereby shoot-through.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
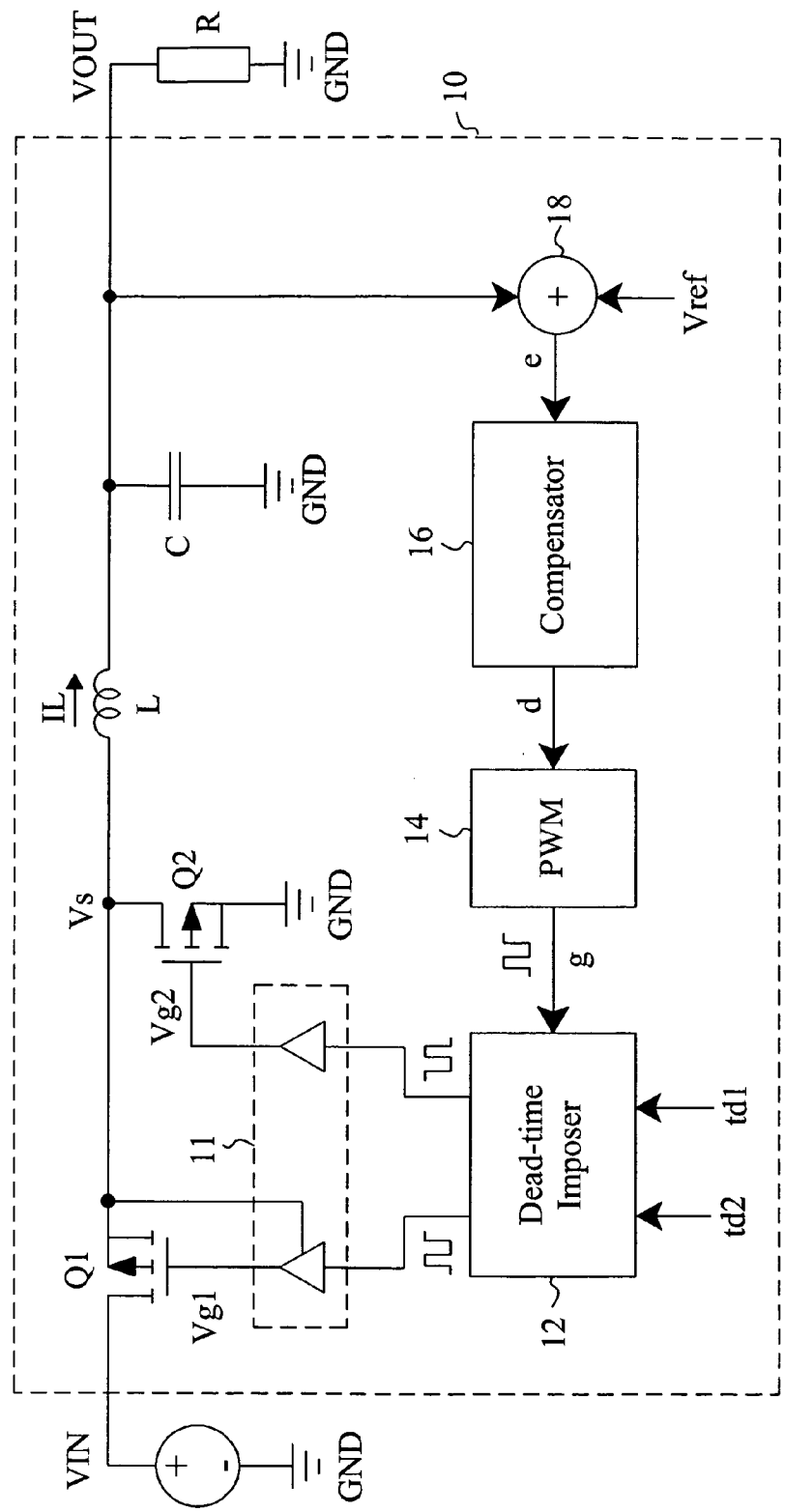
FIG. 1 is a circuit diagram of a conventional digital synchronous buck converter with sensorless optimization of dead-time.
Figure 2:
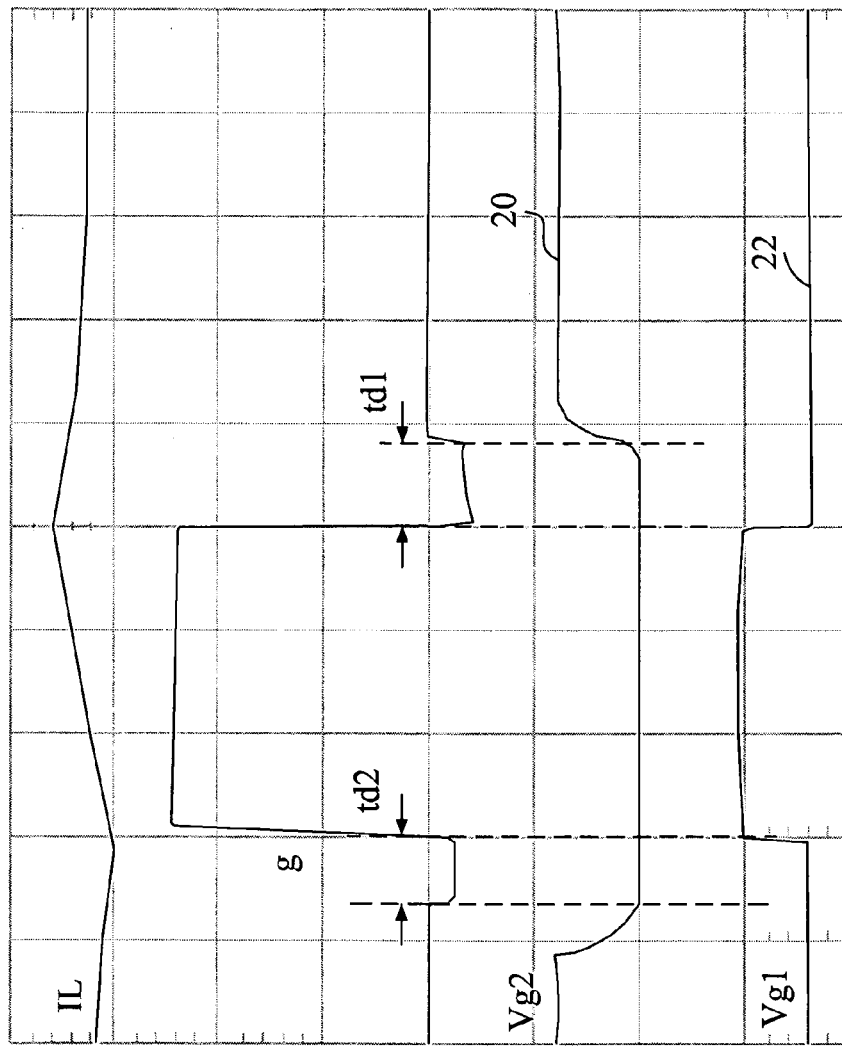
FIG. 2 is waveform diagram of the converter shown in FIG. 1.
Figure 3:
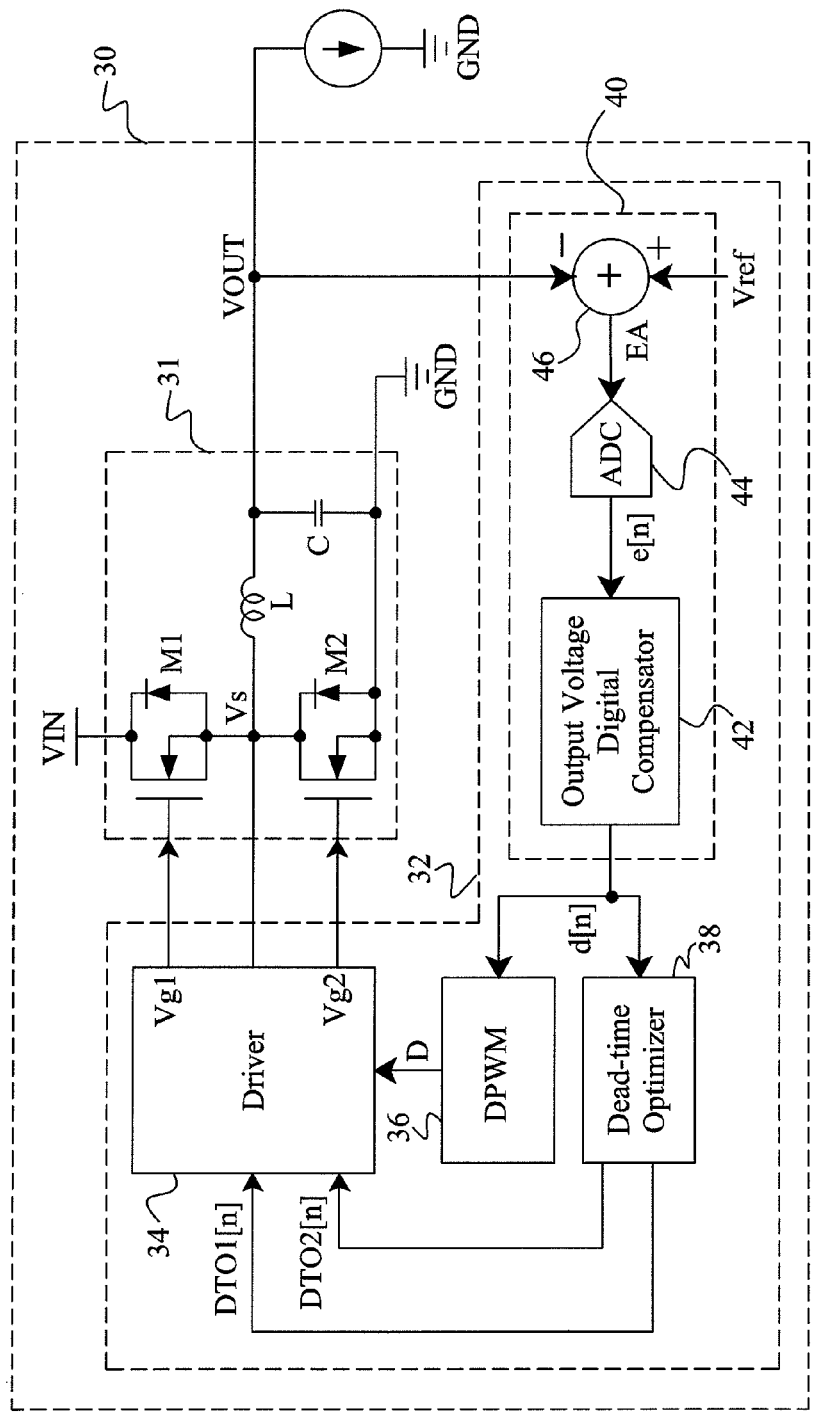
FIG. 3 is a circuit diagram of a digital synchronous buck converter according to the present invention.

According to the present invention, as shown in FIG. 3, a digital synchronous switching converter 30 includes a power stage 31 and a control circuit 32 to operate the power stage 31. The control circuit 32 provides driving signals Vg1 and Vg2 to switch a pair of serially connected power switches M1 and M2 in the power stage 31 to convert an input voltage VIN into an output voltage VOUT. In the control circuit 32, a driver 34 generates the driving signals Vg1 and Vg2 according to a pulse width modulation signal D and delay signals DTO1[n] and DTO2[n], a feedback loop 40 detects the output voltage VOUT to generate a digital feedback signal d[n], a digital pulse width modulator 36 generates the pulse width modulation signal D according to the digital feedback signal d[n] for the driver 34 to regulate the output voltage VOUT, and a dead-time optimizer 38 generates the delay signals DTO1[n] and DTO2[n] according to the digital feedback signal d[n] for the driver 34 to dynamically adjust a dead-time of the power switches M1 and M2 and therefore find out a minimal feedback signal d[n] at a steady state while the output voltage V0 remains under a specification. The feedback loop 40 includes an error amplifier 46 to compare the output voltage VOUT with a reference voltage Vref to generate an analog error signal EA, an analog-to-digital converter 44 to convert the analog error signal EA into a digital error signal e[n], and an output voltage digital compensator 42 to compensate the digital error signal e[n] to generate the digital feedback signal d[n]. The digital synchronous switching converter 30 has two loops, one referred as output voltage control loop for regulating the output voltage VOUT, and the other referred as dead-time optimization loop for dynamically adjusting the dead-time of the power switches M1 and M2. The output voltage control loop includes the power stage 31, the feedback loop 40, the digital pulse width modulator 36, and the driver 34.

The dead-time optimization loop includes the power stage 31, the feedback loop 40, the dead-time optimizer 38, and the driver 34.

Figure 4:
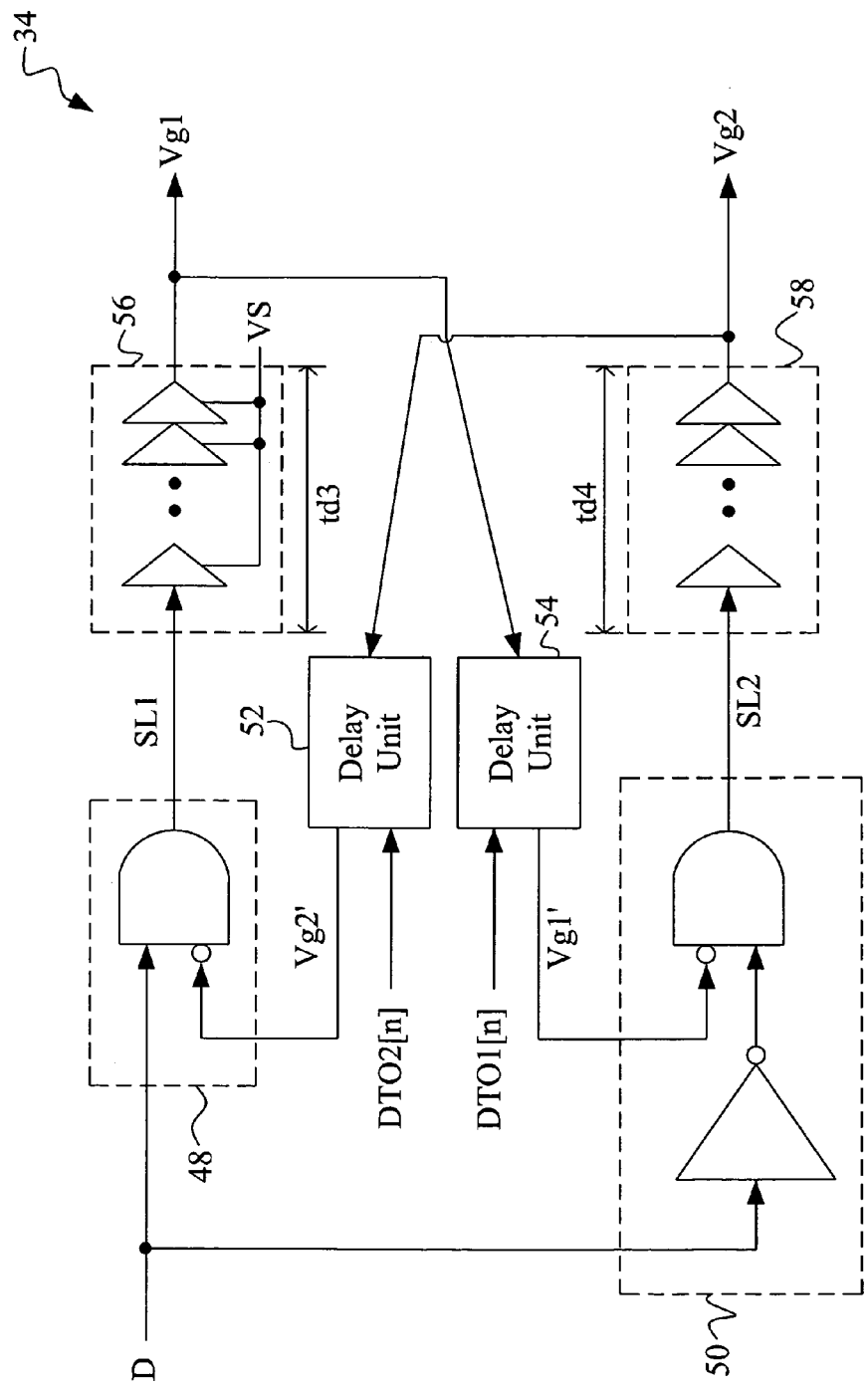
FIG. 4 is a circuit diagram of an embodiment for the driver shown in FIG. 3.

FIG. 4 is a circuit diagram of an embodiment for the driver 34, in which a delay unit 52 delays the driving signal Vg2 according to the delay signal DTO2[n] to generate a driving signal Vg2', a delay unit 54 delays the driving signal Vg1 according to the delay signal DTO1[n] to generate a driving signal Vg1', a logic circuit 48 includes an AND gate to generate a logic signal SL1 according to the pulse width modulation signal D and driving signal Vg2', a buffer 56 delays the logic signal SL1 to generate the driving signal Vg1, a logic circuit 50 includes an inverter and an AND gate to generate a logic signal SL2 according to the pulse width modulation signal D and the driving signal Vg1', and a buffer 58 delays the logic signal SL2 to generate the driving signal Vg2. In this embodiment, the driver 34 monitors the driving signal Vg2 before turning on the power switch M1, and turns on the power switch M1 after recognizing the power switch M2 being turned off. Similarly, the driver 34 monitors the driving signal Vg1 before turning on the power switch M2, and turns on the power switch M2 after recognizing the power switch M1 being turned off. By this way, shoot-through is prevented, and thus the power switches M1 and M2 are protected even if the dead-time is very short.

Figure 5:
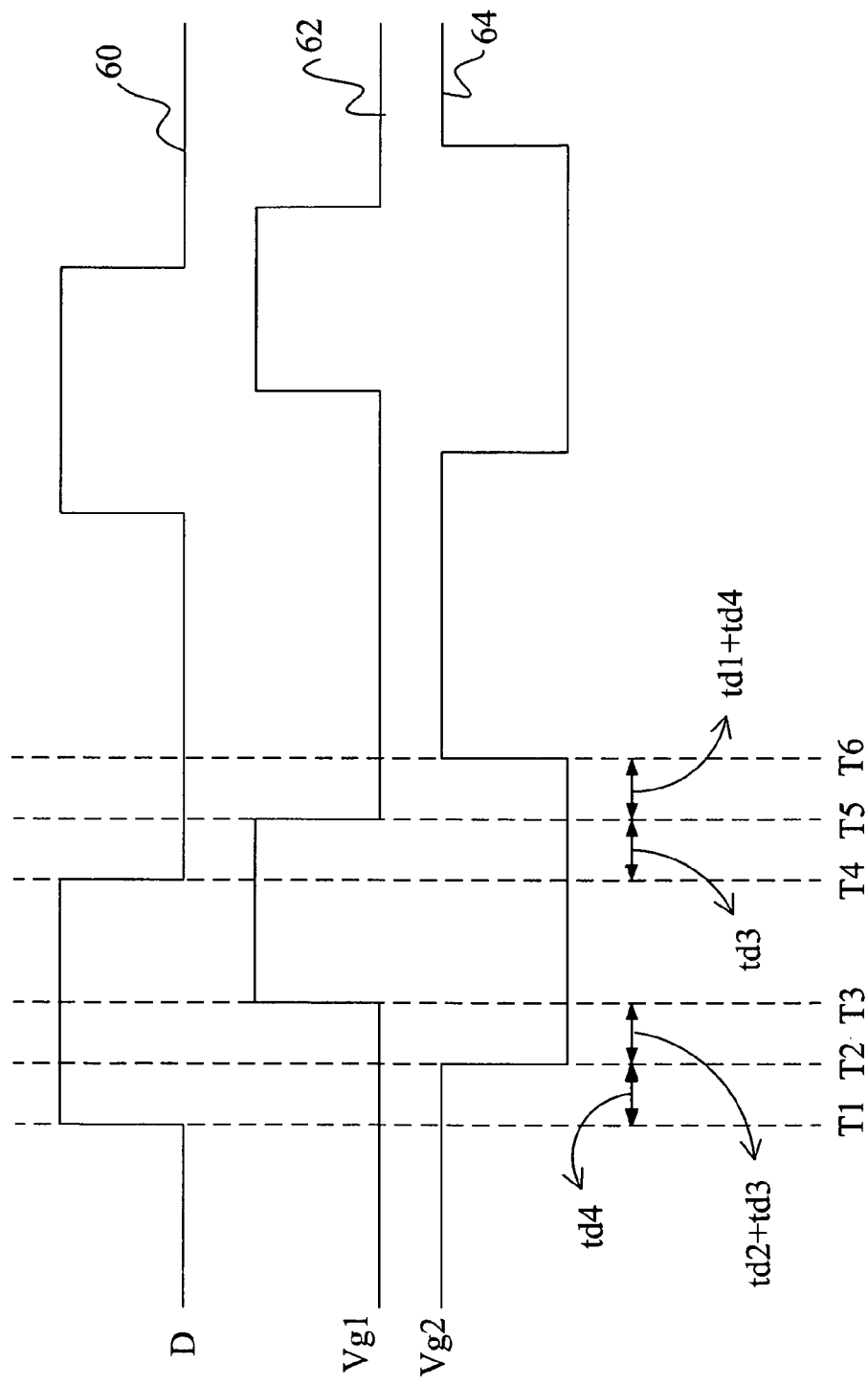
FIG. 5 is waveform diagram of the driver shown in FIG. 4.

FIG. 5 is waveform diagram of the driver 34 shown in FIG. 4, in which waveform 60 represents the pulse width modulation signal D, waveform 62 represents the driving signal Vg1, and waveform 64 represents the driving signal Vg2. Referring to FIGS. 4 and 5, once the pulse width modulation signal D transits to high at time T1, the driving signal Vg2 will transit to low after a delay time td4, as shown at time T2, due to the buffer 58, and then the driving signal Vg1 will transit to high after a delay time td2+td3 resulted from the delay unit 52 and buffer 56, as shown at time T3. In other words, the total delay time from the pulse width modulation signal D transiting to high to the driving signal Vg1 transiting to high is td4+td2+td3. Similarly, once the pulse width modulation signal D transits to low at time T4, the driving signal Vg1 will transit to low after a delay time td3, as shown at time T5, due to the buffer 56, and then the driving signal Vg2 will transit to high after a delay time td1+td4 resulted from the delay unit 52 and buffer 56, as shown at time T6. In other words, the total delay time from the pulse width modulation signal D transiting to low to the driving signal Vg2 transiting to high is td3+td1+td4.

Figure 6:
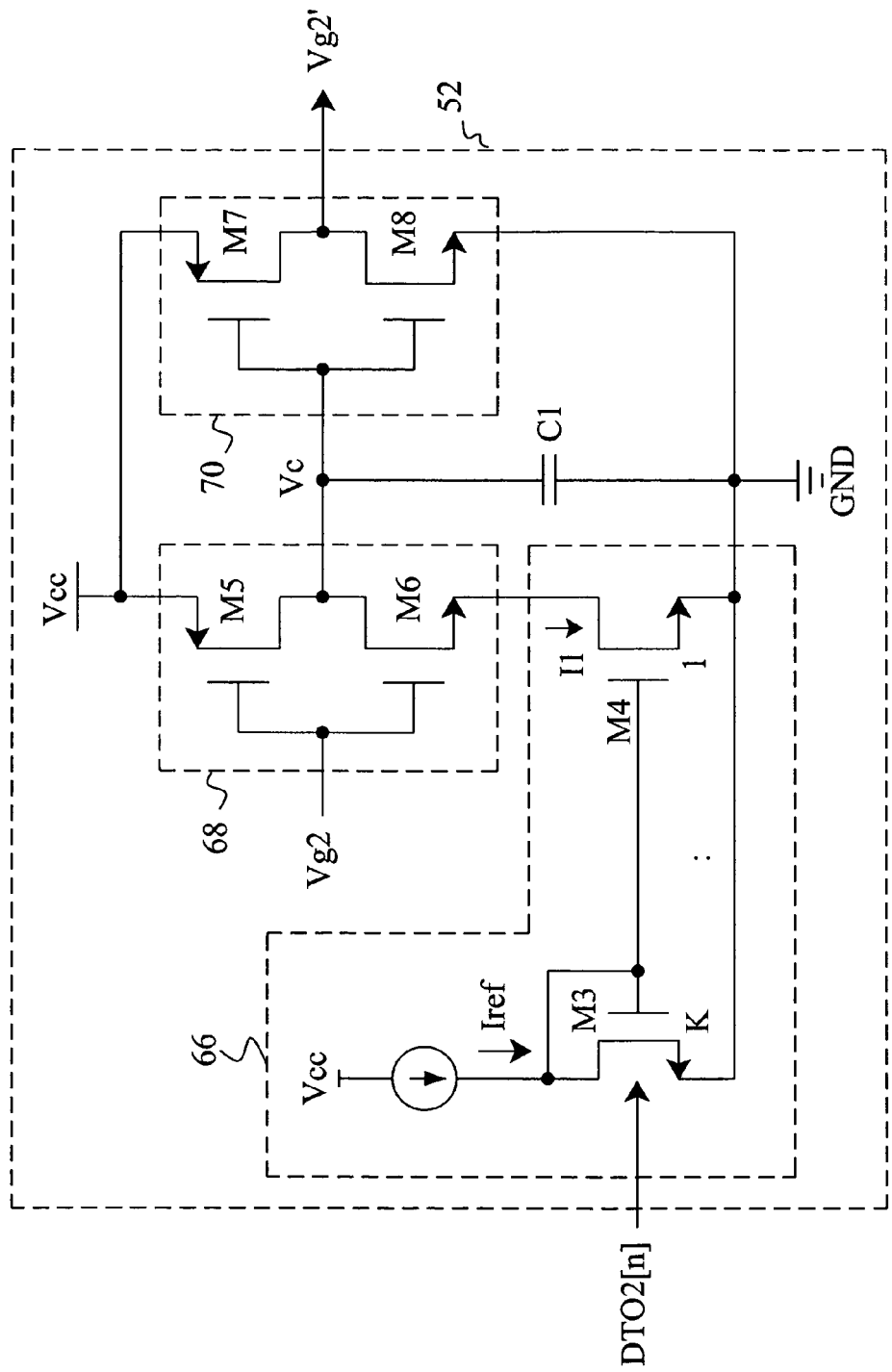
FIG. 6 is a circuit diagram of an embodiment for the delay unit shown in FIG. 4.

FIG. 6 is a circuit diagram of an embodiment for the delay unit 52, in which a current source 66 determines a discharge current I1 according to the delay signal DOT2[n], a switching circuit 68 includes a PMOS transistor M5 and an NMOS transistor M6 connected in series between a voltage node Vcc and the current source 66 to control charging and discharging of a capacitor C1 according to the driving signal Vg2, and a switching circuit 70 includes a PMOS transistor M7 and an NMOS transistor M8 connected in series between the voltage node Vcc and a ground terminal GND to generate the driving signal Vg2' according to a voltage Vc of the capacitor C1. Once the driving signal Vg2 transits to high, the transistor M5 will be turned off and the transistor M6 will be turned on, and thus the capacitor C1 will be discharged by the discharge current I1. When the voltage Vc is lower than a first threshold, the transistor M7 will be turned on and the transistor M8 will be turned off, thereby asserting the driving signal Vg2'. Once the driving signal Vg2 transits to low, the transistor M5 will be turned on and the transistor M6 will be turned off, and thus the capacitor C1 will be charged by the voltage source Vcc. When the voltage Vc is higher than a second threshold, the transistor M7 will be turned off and the transistor M8 will be turned on, thereby terminating the driving signal Vg2'. In this embodiment, the discharge current I1 determines the delay time td2 counted from the driving signal Vg2 transiting to high to the driving signal Vg2' transiting to high, and the delay time td2 decreases (increases) as the discharge current I1 increases (decreases).

In the embodiment shown in FIG. 6, the current source 66 includes a current mirror composed of transistors M3 and M4 such that a reference current Iref in the transistor M3 is proportionally mirrored to the transistor M4 to generate the discharge current I1, and the mirror ratio of I1 to Iref depends on the size ratio of M4 to M3. Hence, parallel connection of a plurality of transistors as the transistor M3, of which the number of effective transistors is selected by the delay signal DTO2[n] to change the size of the transistor M3, will adjust the discharge current I1.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control circuit for a digital synchronous switching converter including two serially connected power switches, the control circuit comprising:
   a feedback loop connected to a voltage output terminal of the digital synchronous switching converter, for detecting an output voltage thereon to generate a digital feedback signal;
   a digital pulse width modulator connected to the feedback loop, responsive to the digital feedback signal to generate a pulse width modulation signal;
   a dead-time optimizer connected to the feedback loop, responsive to the digital feedback signal to determine a dead-time for the power switches; and
   a driver connected to the digital pulse width modulator and dead-time optimizer, responsive to the pulse width modulation signal and an output signal of the dead-time optimizer to generate a first driving signal and a second driving signal to switch the power switches, respectively, to thereby generate the output voltage.

2. The control circuit of claim 1, wherein the feedback loop comprises:
   an error amplifier connected to the voltage output terminal, for comparing the output voltage with a reference voltage to generate an analog error signal;
   an analog-to-digital converter connected to the error amplifier, for converting the analog error signal into a digital error signal; and
   a compensator connected to the analog-to-digital converter, for compensating the digital error signal to generate the digital feedback signal.

3. The control circuit of claim 1, wherein the dead-time optimizer generates a first delay signal and a second delay signal according to the digital feedback signal.

4. The control circuit of claim 3, wherein the driver comprises:
   a first logic circuit connected to the pulse width modulator, responsive to the pulse width modulation signal and a third driving signal to generate a first logic signal;
   a first buffer connected to the first logic circuit, for delaying the first logic signal to generate the first driving signal;

a first delay unit connected to the first logic circuit and dead-time optimizer, responsive to the second delay signal to delay the second driving signal to generate the third driving signal;

a second logic circuit connected to the pulse width modulator, responsive to the pulse width modulation signal and a fourth driving signal to generate a second logic signal;

a second buffer connected to the second logic circuit, for delaying the second logic signal to generate the second driving signal; and a second delay unit connected to the second logic circuit and dead-time optimizer, responsive to the first delay signal to delay the first driving signal to generate the fourth driving signal.

5. The control circuit of claim 4, wherein the first delay unit comprises:

a capacitor;

a first switching circuit connected to the capacitor, responsive to the second driving signal to control charging and discharging of the capacitor;

a second switching circuit connected to the capacitor, responsive to a voltage of the capacitor to apply a first voltage or a second voltage to an output of the first delay unit to generate the third driving signal; and a current source connected to the first switching circuit, for establishing a discharge current varying with the second delay signal to discharge the capacitor.

6. A control method for a digital synchronous switching converter including two serially connected power switches, the control method comprising:

a) providing a first driving signal and a second driving signal for switching the power switches, respectively, to generate an output voltage;

b) detecting the output voltage for generating a digital feedback signal; and c) responsive to the digital feedback signal, regulating the output voltage and adjusting a dead-time of the power switches;

wherein the step c comprises:

responsive to the digital feedback signal, generating a pulse width modulation signal for regulating the output voltage; and responsive to the digital feedback signal, generating a first delay signal and a second delay signal for adjusting the dead-time.

7. The control method of claim 6, further comprising monitoring the first and second driving signals for preventing the power switches from being turned on simultaneously.

8. The control method of claim 6, wherein the step b comprises:

comparing the output voltage with a reference voltage for generating an analog error signal;

converting the analog error signal into a digital error signal; and compensating the digital error signal for generating the digital feedback signal.

9. The control method of claim 6, wherein the step a comprises:

responsive to the second delay signal, delaying the second driving signal to generate a third driving signal;

responsive to the first delay signal, delaying the first driving signal to generate a fourth driving signal;

responsive to the pulse width modulation signal and third driving signal, generating a first logic signal;

responsive to the pulse width modulation signal and fourth driving signal, generating a second logic signal; and delaying the first and second logic signals, respectively, for generating the first and second driving signals.

10. The control method of claim 9, wherein the step of delaying the second driving signal to generate a third driving signal comprises:

responsive to the second driving signal, controlling charging and discharging of a capacitor;

responsive to the second delay signal, adjusting a speed of discharging the capacitor; and responsive to a voltage of the capacitor, generating the third driving signal.

* * * * *